United States Patent
Li et al.

(10) Patent No.: US 9,053,021 B2
(45) Date of Patent: Jun. 9, 2015

(54) MANAGEMENT APPARATUS AND METHOD OF DISTRIBUTED STORAGE SYSTEM

(75) Inventors: Zhihui Li, Hangzhou (CN); Kun He, Hangzhou (CN); Jun Yu, Hangzhou (CN); Yi Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 135 days.

(21) Appl. No.: 13/618,815

(22) Filed: Sep. 14, 2012

(65) Prior Publication Data

US 2013/0080488 A1   Mar. 28, 2013

(30) Foreign Application Priority Data

Sep. 23, 2011  (CN) .......................... 2011 1 0285802

(51) Int. Cl.
  *G06F 11/07*  (2006.01)
  *G06F 11/20*  (2006.01)

(52) U.S. Cl.
  CPC ........ *G06F 11/0709* (2013.01); *G06F 11/2069* (2013.01)

(58) Field of Classification Search
  CPC .......................... G06F 11/0709; G06F 11/2069
  See application file for complete search history.

(56) References Cited

U.S. PATENT DOCUMENTS

| | | | |
|---|---|---|---|
| 5,754,781 A * | 5/1998 | Kitta | 709/213 |
| 2004/0153479 A1 | 8/2004 | Mikesell et al. | |
| 2005/0102548 A1 | 5/2005 | Lindenstruth et al. | |
| 2005/0108593 A1 * | 5/2005 | Purushothaman et al. | 714/4 |
| 2007/0143359 A1 | 6/2007 | Uppala | |
| 2008/0313241 A1 | 12/2008 | Li et al. | |
| 2009/0210875 A1 | 8/2009 | Bolles et al. | |
| 2010/0064166 A1 | 3/2010 | Dubnicki et al. | |
| 2010/0106906 A1 | 4/2010 | Galloway et al. | |
| 2010/0232288 A1 | 9/2010 | Coatney et al. | |
| 2011/0225453 A1 | 9/2011 | Spry et al. | |
| 2011/0246643 A1 | 10/2011 | Kubota | |
| 2012/0084383 A1 | 4/2012 | Bernbo et al. | |
| 2013/0097284 A1 | 4/2013 | Bai et al. | |

FOREIGN PATENT DOCUMENTS

| | | |
|---|---|---|
| EP | 2202921 | 6/2010 |
| WO | WO2008109321 | 9/2008 |

OTHER PUBLICATIONS

Eli the Computer Guy, Introduction to Cloud Computing Dec. 17, 2010, https://www.youtube.com/watch?v=HEEnLZV2wGI&index=1&list=PL7BaH2zo8GT87ZAIBHiGQVyXvzmngu5_P.*

(Continued)

*Primary Examiner* — Jason Liao
(74) *Attorney, Agent, or Firm* — Lee & Hayes, PLLC

(57) ABSTRACT

Methods and systems for managing distributed storage servers are described. The storage servers may be selected and divided into multiple sequences and multiple virtual node groups. Each sequence of the multiple sequences may include a predetermined number of storage servers, and each virtual node group may include a set of storage servers of the multiple sequences. Data may be transferred to storage severs of a virtual node group. If the storage servers have instantaneous or temporary malfunctions, the data may be transferred to temporary storage servers and then transferred back the storage servers after being revived. If the storage servers have permanent malfunctions, the data may be transferred to the temporary storage servers. The storage servers may be replaced using the temporary storage servers.

20 Claims, 3 Drawing Sheets

(56) References Cited

OTHER PUBLICATIONS

The PCT Search Report mailed Jan. 22, 2013 for PCT application No. PCT/US12/55629, 13 pages.

Translated Chinese Office Action mailed Jan. 7, 2015, for Chinese Patent Application No. 201110285802.8, foreign priority application of U.S. Appl. No. 13/618,815, 11 pgs.

* cited by examiner

MANAGEMENT APPARATUS AND METHOD OF DISTRIBUTED STORAGE SYSTEM

CROSS REFERENCE TO RELATED PATENT APPLICATIONS

This application claims priority to Chinese Patent Application No. 201110285802.8, filed on Sep. 23, 2011, entitled "Management Apparatus and Method of Distributed Storage System," which is hereby incorporated by reference in its entirety.

TECHNICAL FIELD

This disclosure relates to the field of distributed storage technologies. More specifically, the disclosure relates to devices and methods for managing distributed storage systems.

BACKGROUND

Traditional storage systems centralize storage servers to store data. Using centralized servers, the traditional storage systems have some disadvantages (e.g., low performance, reliability and security). Recently, distributed storage systems have been developed to overcome these disadvantages. As a scalable system, a distributed storage system shares storage load using location-based servers. However, in some situations, such as server downtime, maintenance downtime, or network failure, the distributed storage system may be unusable. Although existing technologies provide solutions to deal with such situations, these solutions make current distributed storage systems complicated and hence result in low performance of the storage systems (e.g., a long latency and low throughput).

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Described herein are techniques for managing distributed storage units. The storage units may be divided into multiple sequences and multiple virtual node groups. In some embodiments, each sequence of the multiple sequences may include a predetermined number of storage servers, and each virtual node group may include a set of storage servers of the multiple sequences. Data may be transferred to a storage unit of a virtual node group. The storage unit may be determined unusable if the data is not successfully transferred to the storage unit within a predetermined number of retries. The data may be then transferred to a temporary storage unit.

In some aspects, the storage unit may be determined not revivable if data is not successfully transferred to the storage unit within an additional predetermined number of retries. The storage unit may then be replaced using the temporary storage unit.

BRIEF DESCRIPTION OF THE DRAWINGS

The Detailed Description is described with reference to the accompanying figures. The use of the same reference numbers in different figures indicates similar or identical items.

DETAILED DESCRIPTION

The discussion below describes specific exemplary embodiments of the present disclosure. The exemplary embodiments described here are for exemplary purposes only, and are not intended to limit the present disclosure.

Figure 1:
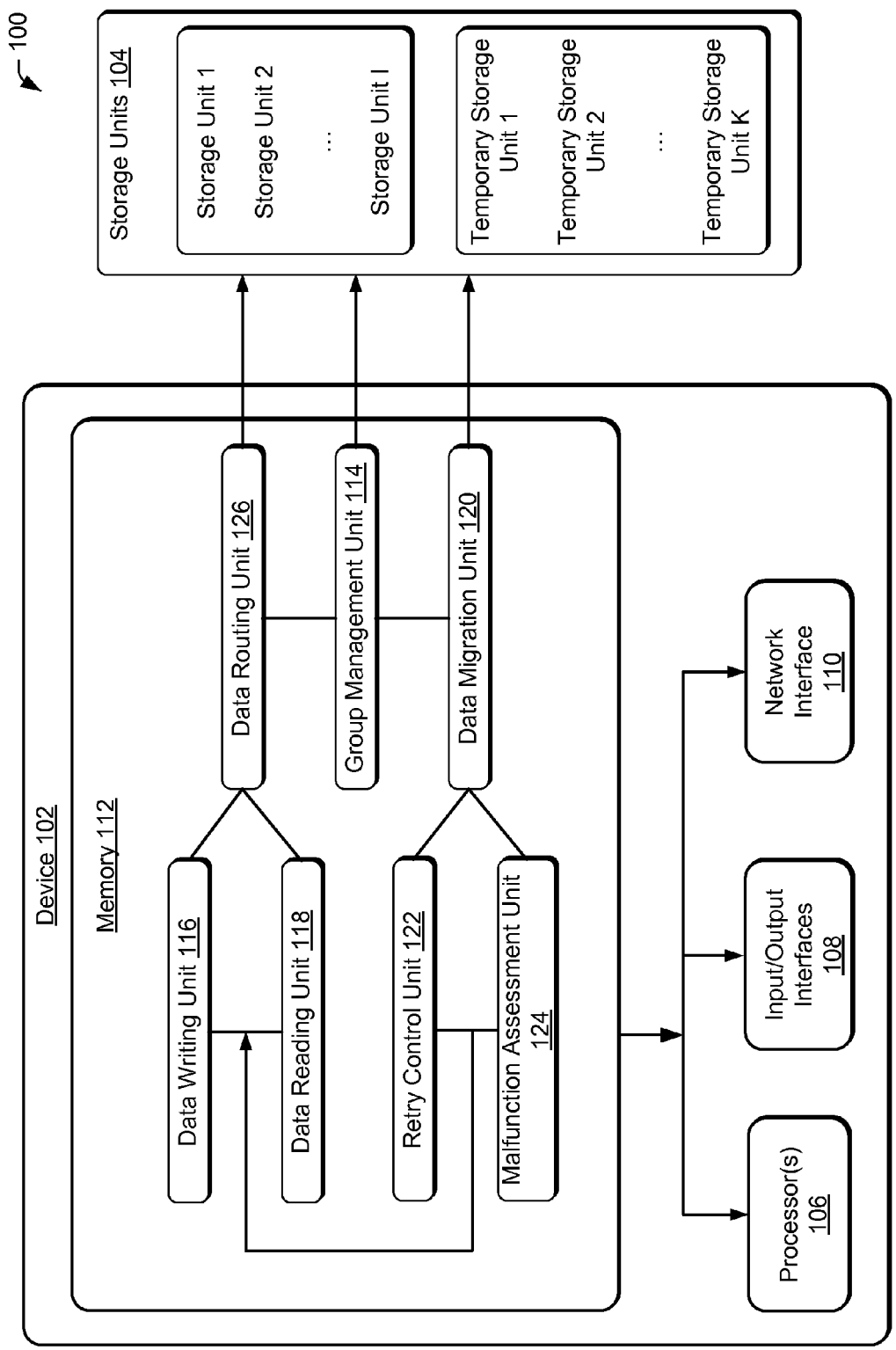
FIG. 1 is a block diagram of an illustrative system that includes a device for distributed storage management.

FIG. 1 is a block diagram of an illustrative system 100 in which distributed storage may be managed. The system 100 may include a device 102 and a plurality of storage units 104. The device 102 may manage the storage units 104. The device 102 may be configured as any suitable computing device(s). In one exemplary configuration, the device 102 includes one or more processors 106, input/output interfaces 108, network interface 110, and memory 112.

The memory 112 may include computer-readable media in the form of volatile memory, such as random-access memory (RAM) and/or non-volatile memory, such as read only memory (ROM) or flash RAM. The memory 112 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 112 in more detail, the memory 112 may store a group management unit 114. The group management unit 114 may manage the storage units 104. In some embodiments, the storage units may be storage servers. In the illustrated embodiment, the storage units 104 may include multiple storage units (i.e., storage unit 1, storage unit 2, ... storage unit I) and multiple temporary units (i.e., temporary storage unit 1, temporary storage unit 2, ... temporary storage unit K), wherein I and K are integers and greater than 2.

In the system 100, the group management unit 114 may select multiple storage units from the storage units 104 and divide these multiple storage units into multiple sequences. For instance, suppose that the storage units 104 include N number of storage servers, wherein N is an integer. The group management unit 114 may select M number of storage servers and divide them into x peer sequences. In some embodiments, each peer sequence may include a same predetermined number of storage servers. In other embodiments, individual peer sequences may include various numbers of storage servers.

After selecting M number of storage servers, the group management unit 114 may divide the selected M number of storage servers into y virtual node groups. In some embodiments, each virtual node group may include z number of storage servers that belong to different peer sequences. In some embodiments, each individual virtual node group may include a same number of storage servers. In other embodiments, each individual virtual node group may include various numbers of storage servers. Here, N, M, x, y and z are integers and satisfy the following conditions: N≥3, 2≤M<N, x≥2, y≥1, x·y≥M (where "·" represents multiplication), and 2≤z≤x. In some embodiments, after selecting M number of storage servers, the group management unit 114 may designate the remaining storage servers of the N number of storage servers as temporary storage servers.

In some embodiments, storage servers of each virtual node group may belong to different peer sequences. In these instances, x, y, and M may satisfy the following condition: M=x·y, and z=x. For instances, the selected M number of storage servers may be represented using a combined array: $a_{[x][y]}$, which is shown below:

$$a_{[x][y]} = \begin{bmatrix} a_{11} & a_{12} & \ldots & a_{1y} \\ a_{21} & \ldots & \ldots & \ldots \\ \vdots & \ldots & \ldots & \ldots \\ a_{x1} & \ldots & \ldots & a_{xy} \end{bmatrix}$$

As illustrated above, each of the M number of storage servers may be represented as an array element of the array a[x][y]. In other embodiments, the array may include one or more blank elements when M<x·y. In these instances, numbers of storage servers in individual virtual node groups are not the same.

To simplify the discussion, unless otherwise specified, the discussions below are all based on the scenario where the numbers of storage servers in individual peer sequence are the same. In these instances, using the above array a[x][y] as an example, the M number of storage servers are divided into x peer sequences. For instance, in the example array illustrated above, array elements that correspond to storage servers in the $1^{st}$ and $x^{th}$ peer sequences are [a11, 12, . . . , a1y] and [ax1, ax2, . . . , axy], respectively; array elements that correspond to the storage servers in the $1^{st}$ and $y^{th}$ virtual node groups are [a11, a21, . . . , ax1] and [a1y, a2y, . . . , axy], respectively.

In some embodiments, the memory 112 may also include a data writing Unit 116 and a data reading unit 118. The data writing unit 116 may write the data into storage servers of a virtual node group. In some embodiments, the data writing unit 116 may write the data into each storage server of the virtual node group. In these instances, the virtual node group may be randomly selected or selected based on preset rules. When a portion of the storage servers in the virtual node group cannot be used (e.g., failure to response to write/read requests), the data writing unit 116 may write the data into the remaining usable storage servers in the virtual node group and a temporary storage server designated by the group management unit 114, as discussed above.

The data reading unit 118 may read data from any of the usable storage servers in the virtual node group into which the data has been written. In some embodiments, the virtual node group may be selected, and the data may be written into storage servers of the virtual node group. For instance, the data writing unit 116 may write the data into each storage server of the virtual node group. Accordingly, if all storage servers are usable, the data stored in all member storage servers of individual peer sequences are the same.

If a storage server in a virtual node group is unusable, data to be written into the unusable storage server may be written into a temporary storage server. Also, the data may be written into the remaining storage servers of the virtual node group. If the storage server becomes usable and therefore revives, the data may be transferred back to the storage server. In some instances, the data may then be removed from the temporary storage server.

In some embodiments, when data reading is in progress, the data reading unit 118 may randomly select a storage server from the virtual node groups where the data was written into. In other embodiments, the storage server may be selected using a predetermined selection algorithm.

In some embodiments, the memory may also include a data migration unit 120, a retry control unit 122, a malfunction assessment unit 124, and a data routing unit 126. In some instances, the data migration unit 120 may transfer the data in the temporary storage data back to the storage server that is revived after a malfunction. In some other embodiments, the unusable storage server cannot be revived. In these instances, the data migration unit 120 may transfer or copy data in the other usable storage servers of the virtual node group to the temporary storage server and replace the unusable storage server using the temporary storage.

The temporary storage server may function for at least two purposes. The temporary storage server may be used for temporary data storage during the period when the storage server is not available for use. When the storage server is revived, the data can be transferred back. In addition, the temporary storage server may be used as a replacement for the unrevivable storage server. When the unusable storage server can no longer be revived for use, the data from the storage servers in the other peer sequences associated with the corresponding virtual node group may be moved to the temporary storage server to replace the unrevivable storage server. Accordingly, the temporary storage server may replace not only the role of the unrevivable storage server in the virtual node group and the peer sequence but also functionality of the unrevivable storage server (i.e., data reading and writing).

In some embodiments, the retry control unit 122 may control the number of retries for data writing and reading. The retry control unit 122 may determine a predetermined number for the data writing unit 116 and data reading unit 118 to perform data writing and reading after a storage server malfunction (e.g., failure to respond to writing and/or reading requests). The malfunction assessment unit 124 may determine the storage server to be unusable if the retry control unit 122 determines that the number of retries has reached the predetermined number. The malfunction assessment unit 124 may then instruct the retry control unit 122 to re-examine the storage server. The retry control unit 122 may determine an additional predetermined number for the data writing unit 116 and the data reading unit 118 to perform data writing and reading after the storage server is determined as unusable. Upon re-examination, the malfunction assessment unit 124 may determine the storage is unrevivable if the additional predetermined number of retries has been reached and the storage server still cannot be written/read. The malfunction assessment unit 124 may send the assessment to the data migration unit 120 to replace the storage server using the temporary storage server.

Based on the discussion above, it is noted that the device 102 in the embodiments of the present disclosure provides processing mechanisms to handle an instantaneous malfunction, temporary malfunction, and permanent malfunction. In some embodiments, the instantaneous malfunction may refer to the application server's (e.g., application program) inability to connect to the storage server for a very short time (e.g., less than a second) due to instant network downtime or other reasons. Hence the retry control unit 122 may allow the data writing unit 116 or the data reading unit 118 to revisit the application server after a fixed number of reading and writing requests. In order not to affect the application server's (e.g., application program) functionality and usage experience, the number of retries may be small, and there may not be a time interval between two retries.

In some embodiments, the temporary malfunction may refer to the storage server being temporarily unavailable due to upgrades, security updates or other reasons, while, after a certain time, the storage server can be used again. The permanent malfunction may refer to data loss caused by hardware damage or other extreme reasons, and therefore the storage server can no longer be used again.

For example, after a number of retries controlled by the retry control unit 122 has reached a predefined number, the malfunction assessment unit 124 may conclude that the corresponding storage server has failed (unusable), and communicates the assessment result to the data writing unit 116 and data reading unit 118. Afterwards, as discussed above, data writing operation may be performed to the remaining usable storage servers in the virtual node group that corresponds to the failed storage server. In these instances, the data reading operation will be performed in any of the storage servers in the virtual node group that corresponds to the failed storage server. The malfunction assessment unit 124 may use the retry control unit 122 to re-examine the storage server state based on an additional predetermined number. Upon examining that it can be used (which means that the storage server has gone through a "temporary malfunction" and has been revived for use), the malfunction assessment unit 124 may notify the data migration unit 120 to transfer or migrate the data in the temporary storage server back to the revived storage server. When the malfunction assessment unit 124 has examined that the corresponding storage sever cannot be used and the number of retries has reached the additional predetermined number (which means that the storage server is "permanently malfunctioned"), the malfunction assessment unit 124 can notify the data migration unit 120 to start copying a portion of or all the data from the other usable storage servers in the virtual node group (where the malfunctioned storage server belongs) into the temporary storage server. The temporary storage server may then replace the unrevivable storage server.

In some embodiments, when the retry control unit 122 re-examines the storage server state based on the additional predetermined number, the retry control unit 122 may repeatedly retry the writing or reading operations using the data writing unit 116 and data reading unit 118, respectively. Based on the success or failure of the retries, the malfunction assessment unit 124 may conclude whether or not the storage server has been revived for use. In the instantaneous malfunction scenario, the data used for retrying the data reading and writing may be the data that were not successfully read/written. In other embodiments, data for the retries may be predefined test data that is smaller in size than the data that were not successfully read or written.

In some embodiments, compared to the predetermined number, the additional predetermined number is often larger, and a fixed time interval can be set for every two retries. For instance, re-examination can be continually repeated every few seconds, where the additional predetermined number frequency can reach up to tens of thousands and even hundreds of thousands of retry times. The temporary malfunction and permanent malfunction may be caused by some events that can be controlled (e.g. upgrades, security updates) or investigated (e.g. hardware failure) by people. Hence, the malfunction assessment unit 124 may use additional methods to assess whether the temporary malfunction can be revived or may lead to permanent malfunction. In some embodiments, a storage server status table managed by the malfunction assessment unit 124 may be selected in response to an input from, e.g., a user. For instance, the status can be changed to "temporary malfunction", "usable", "permanent malfunction", etc in response to selection of the storage server status table by the user.

In some embodiments, the data routing unit 126 may determine the virtual node group selected by the data writing unit 116 when writing data, and by the data reading unit 118 when reading data. In some embodiments, in order to increase the efficiency of the route, the data routing unit 126 may use the method of array a[x][y] discussed above to manage the storage servers. For instance, the data routing unit 126 also includes a route selection sub-unit, which is used for selecting the virtual node group. The route selection sub-unit may compose $0, 1, \ldots, y-1$ serial numbers to manage the y number of virtual node groups. Based on the hash value of the data to be written, the route selection sub-unit may analyze y to get a value from $[0, \ldots, y-1]$, and then select the virtual node group with a serial number that corresponds to the value obtained from the analysis of y. The route selection sub-unit may set the selected virtual node group as the virtual node group of the data writing unit in data writing. Similarly, based on the hash value of the data to be read, The route selection sub-unit may analyze y to get a value from $[0, \ldots, y-1]$, select the virtual node group with the serial number that corresponds to the value obtained from the analysis of y, and then set the selected virtual node group as the virtual node group of the data reading unit in data reading. In some embodiments, the route selection sub-unit may use the hash value of the data to be written/read Mod y to get a value from $[0, \ldots, y-1]$.

Here, based on a storage principle, due to uniqueness of hash values, the data that is to be written in the selected virtual node group by the data routing unit 126, will be consistent with the same data being read in the selected virtual node group by the data routing unit 126. This may ensure that data that is randomly written into a certain virtual node group may be accurately retrieved from the same virtual node group. Taking a step further, from the process above, the data may be randomly assigned to a virtual node group, and may be written to the storage server that belongs to a peer sequence in the virtual node group. Therefore, the separation of the virtual node groups ensures that the load balance of the distributed storage system is maintained. Also, the separation of the peer sequences ensures that data backup in each peer sequence is maintained/ensured. It is noted that while some embodiments provide the calculation method to select the virtual node groups, other embodiments may provide more complicated calculation methods.

In some embodiments, the device 102 may includes the data writing unit 116, data reading unit 118 and data routing unit 126. These components may be installed in the application server and used as a client of the storage system. However, the group management unit 114, the data migration unit 120, the retry control unit 122 and the malfunction assessment unit 124 can be individually installed in a management server that is different from the storage server and application server. In these instances, they may be used as a middleware/intermediary between the storage server and the application server. It is note that a location-based setup may not affect functional features of different units in the device 102.

Figure 2:
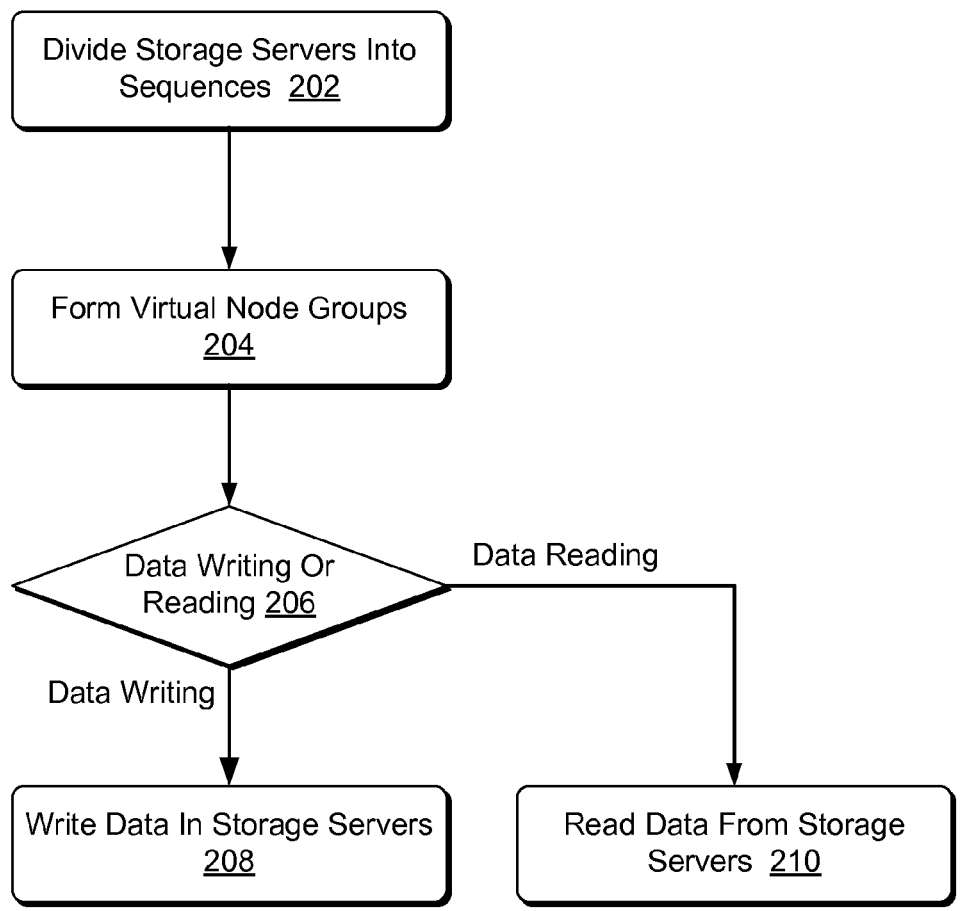
FIG. 2 is a flow diagram of an illustrative process for managing distributed storage using the device of FIG. 1.

FIG. 2 is a flow diagram of an illustrative process for managing distributed storage using the device 102 of FIG. 1. At 202, the device 102 may divide the storage units 104 into multiple sequences. In some embodiments, M number of storage servers may be divided into x peer sequences to form y virtual node groups. In some embodiments, each virtual node group may contain z number of storage servers that belong to different peer sequences, and the remaining N-M storage servers may be designated as temporary storage servers. For instance, the M number of storage servers may be selected in the N number of storage servers. These selected storage servers may then be divided into x peer sequences, where each peer sequence may include a same fixed number of storage servers. In other embodiments, individual peer sequences may include various numbers of storage servers.

At 204, the device 102 may form virtual node groups based on the peer sequences. In some embodiments, the M number of servers may be divided into y virtual node groups. In some instances, each virtual node group may include x number of storage servers belonging to different peer sequences. The remaining N-M storage servers may be designated as temporary storage servers. Here, N, M, x, and y are integers and satisfy the following conditions: $N \geq 3$, $2 \leq M < N$, $x \geq 2$, $y \geq 1$, $x \cdot y \geq M$ (where "·" represents multiplication); z is a natural number variable and satisfies: $2 \leq z \leq x$. In other embodiments, z may be an integer and therefore the number of servers in every virtual node group is the same. For instance, each virtual node group may have storage servers that belong to different peer sequences, wherein the values of x, y, M satisfy the following conditions: $M = x \cdot y$, and $z = x$.

At 206, the device 102 may determine whether the operation is data writing or data reading. If the process is data writing (i.e., the branch of "data writing"), the device 102 may incur the data writing unit 116 to write data into storage servers of a virtual node group that is selected for storage of the data at 208. In some embodiments, the data may be written into each storage server of the selected virtual node group. When a storage server in the virtual node group failed or becomes unusable, the data to be written to the storage server may be written to a selected temporary storage server while the data may be also written into the remaining usable storage servers of the virtual node group. When the storage server is revived for use, data will be moved back.

If the process is data reading (i.e., the branch of "data reading"), the device 102 may incur the data reading unit 118 to read the data from the virtual node group. In some embodiments, the device 102 may randomly select a storage server from the virtual node groups where the data was written into. In some embodiments, to achieve load balancing, the virtual node group where the data is written into may be randomly selected. In other embodiments, the virtual node group for data reading may be selected using a predetermined selection algorithm.

Figure 3:
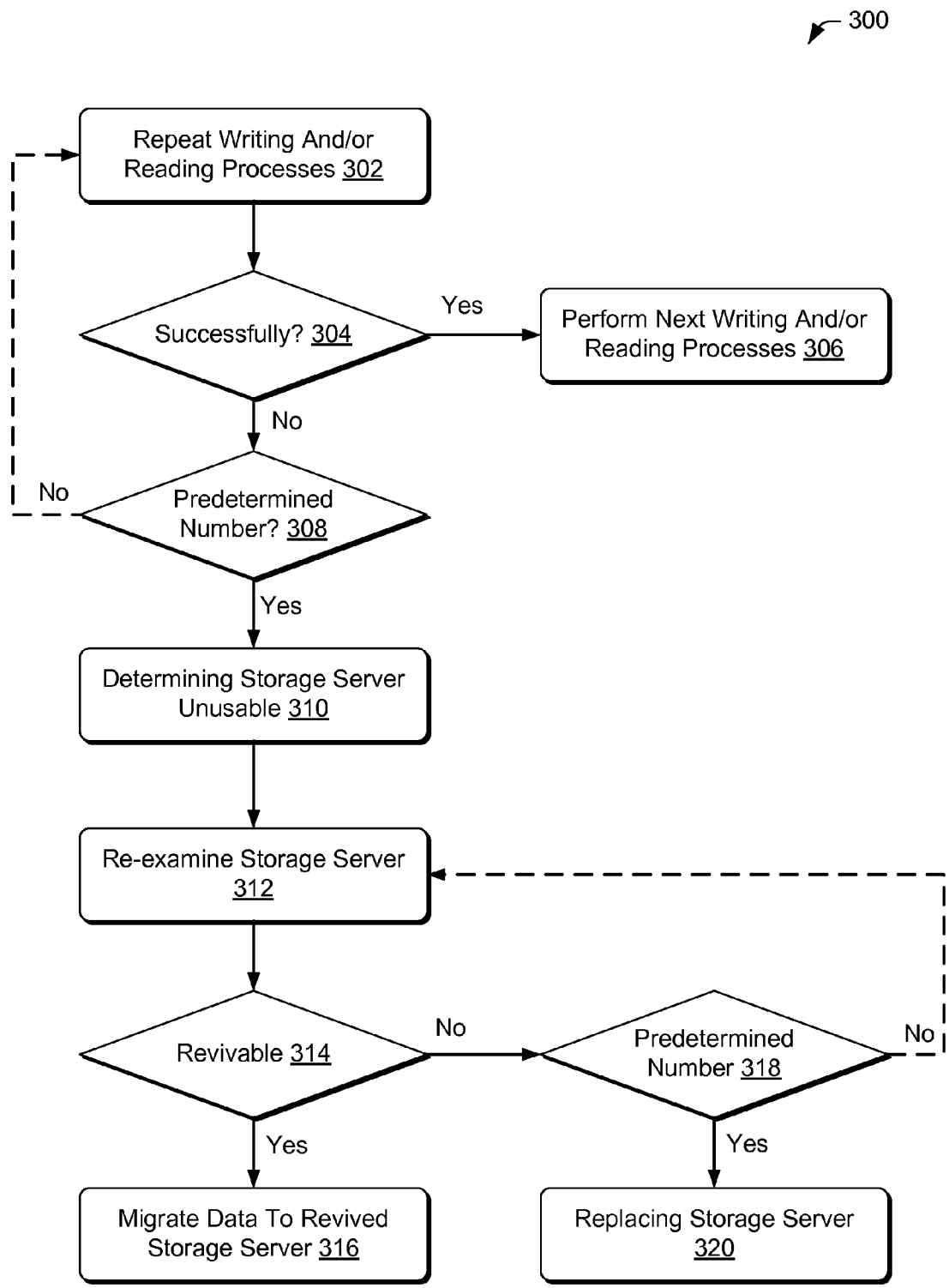
FIG. 3 is a flow diagram of another illustrative process for determining usability of storage servers using the device of FIG. 1.

FIG. 3 is a flow diagram of another illustrative process for determining usability of storage servers using the device 102 of FIG. 1. At 302, the device 102 may repeat writing and/or reading processes in response to determination that a storage server malfunctions. At 304, the system may determine whether the repeated operation is successful. If successful (i.e., the branch of "Yes" of the operation 304), the device 102 may perform next writing and/or reading operations. If unsuccessful (i.e., the branch of "No" of the operation 304), the device 102 may determine how many times the process has been repeated at 308. If the process has been repeated less than a predetermined number of times (i.e., the branch of "No" of the operation 308), the device 102 may perform the operations 302 to 306 by a loop process (see the dashed line from 308 that leads back to 302) that may include operation 306, as needed.

If the process has been repeated more than or equal to the predetermined number of times (i.e., the branch of "Yes" of the operation 308), the device 102 may determine that the storage server is unusable at 310. As discussed above, the data writing operation may be done in the remaining usable storage servers in the virtual node group that corresponds to the failed storage server, and also into a temporary storage server. In other embodiments, the data reading operation may be done in one of the usable storage servers in the virtual node group that corresponds to the failed storage server.

At 312, the device 102 may re-examine the storage server that is determined to be unusable. At 314, the device 102 may determine whether the storage server is revivable. For instance, the unusable storage server has gone through "temporary malfunction" and has been revived for use, which may be due to server upgrades and security updates. The device 102 may then transfer data from the temporary storage server back to the revived storage server. In some embodiments, the temporary storage server may include the data that is written during the storage server's downtime; hence, the data migration operation may be simple and fast.

If the storage server is revived (i.e., the branch of "Yes" of the operation 314), the device 102 may migrate the data from the temporary storage server to the revived storage server at 316. If the storage server is not revived (i.e., the branch of "No" of the operation 314), the device 102 may determine how many times the storage server is re-examined at 318. If the storage server has been re-examined less than a predetermined number of times (i.e., the branch of "No" of the operation 318), the device 102 may perform the operations 312 to 314 by a loop process (see the dashed line from 318 that leads back to 312) that may include the operation 316, as needed. If the storage server has been re-examined more than or equal to the predetermined number of times (i.e., the branch of "Yes" of the operation 318), the device 102 may replace the unrevivable storage server using the temporary storage server at 320.

For instance, the device 102 may determine that the storage server has "permanently malfunctioned", which may be due to hardware failure and other extreme reasons. The device 102 may then copy all the data from the other usable storage servers in the virtual node group (where the malfunctioned storage server belongs) into the temporary storage server, and replacing the malfunctioned storage server using the temporary storage server. In some embodiments, in order to ensure that strict standards in assessing "permanent malfunction" are maintained, compared to the predetermined number of the operation 308, the predetermined number of the operation 318 may be larger. In some instances, the predetermined number of the operation 318 may have a fixed time interval (e.g., a day or a few seconds) between two retries.

It is noted that the peer sequence and virtual node group functionalities is used to divide the storage servers and manage them. Under normal circumstances, data can be written into the storage servers belonging to each peer sequence in the virtual node groups, while data can be read from any of the usable storage servers in the virtual node groups. When a certain storage server has malfunctioned, data can still be read from any of the usable storage servers in the virtual node group, while the data will be simultaneously written (backed-up) into all the usable storage servers in the virtual node group and into a temporary storage server. When the storage server has returned from the temporary malfunction state and has been revived for use, data written during the malfunction period can be migrated from the temporary storage server back to the storage server. When a storage server has permanently malfunctioned and cannot be revived for use, the device 102 may copy the data from one of the usable storage servers into the temporary storage server, and the temporary storage server will replace the malfunctioned storage server.

The specific examples herein are utilized to illustrate the principles and embodiments of the application. The description of the embodiments above is designed to assist in understanding the method and ideas of the present disclosure. However, persons skilled in the art could, based on the ideas in the application, make alterations to the specific embodiments and application scope, and thus the content of the present specification should not be construed as placing limitations on the present application.

What is claimed is:

1. One or more computer-readable media storing computer-executable instructions that, when executed by one or more processors, instruct the one or more processors to perform acts comprising:
    dividing a plurality of storage units into multiple sequences, wherein the multiple sequences collectively include the plurality of storage units, and individual ones of the multiple sequences include multiple storage units of the plurality of storage units;
    dividing the plurality of storage units into multiple virtual node groups, wherein the multiple virtual node groups collectively include the plurality of storage units, and each of the multiple virtual node groups include a set of storage units of the multiple sequences;
    initiating a transfer of data to a storage unit of a virtual node group of the multiple virtual node groups;
    determining that the data is not successfully transferred to the storage unit of the virtual node group; and
    transferring the data to a temporary storage unit different than the plurality of storage units.

2. The one or more computer-readable media of claim 1, wherein the acts further comprise:
    determining whether the storage unit of the virtual node group is revivable;
    in an event that the storage unit is revivable, transferring the data to the storage unit; and
    in an event that the storage unit is not revivable, replacing, in the virtual node group, the storage unit with the temporary storage unit.

3. The one or more computer-readable media of claim 1, wherein the multiple virtual node groups do not include the temporary storage unit.

4. The one or more computer-readable media of claim 1, wherein the acts further comprise:
    determining that particular data is successfully transferred to the storage unit of the virtual node group within a predetermined number of retries;
    determining that the storage unit is revivable; and
    transferring the data from the temporary storage unit to the storage unit.

5. The one or more computer-readable media of claim 4, wherein the particular data is of a first size, the data is of a second size, and the first size is smaller than the second size.

6. The one or more computer-readable media of claim 1, wherein each sequence of the multiple sequences includes a predetermined number of storage units of the plurality of storage units.

7. The one or more computer-readable media of claim 1, wherein each storage unit of the virtual node group of the multiple virtual node groups belongs to a respectively unique sequence of the multiple sequences.

8. The one or more computer-readable media of claim 1, wherein the initiating the transfer of the data to the storage unit of the virtual node group comprises initiating writing of the data into the storage unit.

9. The one or more computer-readable media of claim 1, wherein the acts further comprise:
    determining that the storage unit of the virtual node group is not revivable;
    copying data stored in one usable storage unit of the virtual node group to the temporary storage unit, the one usable storage unit being different from the storage unit that is not revivable; and
    replacing, in the virtual node group, the storage unit with the temporary storage unit.

10. A method comprising:
    dividing a plurality of storage servers into multiple sequences, wherein the multiple sequences collectively include the plurality of storage servers, and individual ones of the multiple sequences include multiple storage servers of the plurality of storage servers;
    dividing the plurality of storage servers into multiple virtual node groups, wherein the multiple virtual node groups collectively include the plurality of storage servers, and each of the multiple virtual node groups include a set of storage servers of the multiple sequences;
    initiating a transfer of data to a storage server of a virtual node group of the multiple virtual node groups;
    determining that a malfunction associated with the storage server has occurred; and
    transferring the data to one or more usable storage servers of the virtual node group and to a temporary server, the one or more usable storage servers being different than the storage server that is associated with the malfunction, and the temporary storage server being different than the plurality of storage servers.

11. The method of claim 10, further comprising:
    determining that the malfunction associated with the storage server of the virtual node group is permanent; and
    replacing, in the virtual node group, the storage server with the temporary server.

12. The method of claim 11, further comprising copying data stored in a usable storage server of the one or more usable storage servers of the virtual node group to the temporary storage server.

13. The method of claim 11, wherein the determining that the malfunction associated with the storage server of the virtual node group is permanent comprises determining that particular data is not successfully transferred to the storage server within a predetermined number of retries.

14. The method of claim 10, wherein the temporary server is selected based on a predetermined rule, and the virtual node group does not include the temporary server.

15. The method of claim 10, wherein the initiating the transfer of the data to the storage server of the virtual node group comprises initiating writing the data into the storage server.

16. A computing device system comprising:
    a plurality of storage servers;
    a temporary storage server; and
    a computing device communicatively coupled to the plurality of storage servers, the computing device comprising:
    one or more processors; and
    memory storing computer-executable instructions that, when executed by the one or more processors, instruct the one or more processors to perform acts including:

dividing the plurality of storage servers into multiple sequences, wherein the multiple sequences collectively include the plurality of storage servers, and individual ones of the multiple sequences include multiple storage servers of the plurality of storage servers;

dividing the plurality of storage servers into multiple virtual node groups, wherein the multiple virtual node groups collectively include the plurality of storage servers, and each of the multiple virtual node groups include a set of storage servers of the multiple sequences;

initiating a transfer of data to a storage server of a virtual node group of the multiple virtual node groups;

determining that the storage server has malfunctioned such that the data fails to transfer to the storage server;

determining that a predetermined number of retries to transfer the data to the storage server have failed; and transferring the data to the temporary storage server, wherein the temporary storage server is different than the plurality of storage servers;

wherein the temporary storage server is configured to receive the data at least partly in response to transferring the data.

17. The system of claim 16, wherein the acts further include transferring the data to the storage server after the storage server is determined to be revived.

18. The system of claim 16; wherein the acts further include replacing, in the virtual node group, the storage server of the virtual node group with the temporary storage server after the storage server is determined to be not revivable.

19. The system of claim 18, wherein the storage server is determined to be not revivable if particular data is not successfully transferred to the storage server of the virtual node group within an additional predetermined number of retries.

20. The system of claim 16, wherein each sequence of the multiple sequences includes a predetermined number of storage servers of the plurality of storage servers, each storage unit of the virtual node group of the multiple virtual node groups belongs to a respectively unique sequence of the multiple sequences, and the virtual node group does not include the temporary storage server.

* * * * *